United States Patent [19]

Yellin

[11] Patent Number: 5,727,090
[45] Date of Patent: Mar. 10, 1998

[54] METHOD OF STORING RASTER IMAGE IN RUN LENGTHS HAVNG VARIABLE NUMBERS OF BYTES AND MEDIUM WITH RASTER IMAGE THUS STORED

[75] Inventor: Martin J. Yellin, Gaithersburg, Md.

[73] Assignee: United States of America as represented by the Secretary of Commerce, Washington, D.C.

[21] Appl. No.: 314,619

[22] Filed: Sep. 29, 1994

[51] Int. Cl.⁶ ................................................ G06K 9/36
[52] U.S. Cl. .................. 382/245; 382/246; 358/261.1; 348/472
[58] Field of Search .................. 382/235, 245, 382/166, 246, 234, 113, 233; 345/153; 358/261.1, 261.2, 261.4, 500, 539, 426, 534, 538, 432, 261.3; 348/391, 402, 409, 415, 420, 422, 472

[56] References Cited

U.S. PATENT DOCUMENTS

| | | | |
|---|---|---|---|
| 3,560,639 | 2/1971 | Centanni | 178/6 |
| 4,344,086 | 8/1982 | Mizuno | 358/78 |
| 4,463,386 | 7/1984 | Goddard | 358/261 |
| 4,704,605 | 11/1987 | Edelson . | |
| 4,811,113 | 3/1989 | Ozeki | 358/261.1 |
| 4,847,677 | 7/1989 | Music | 358/13 |
| 4,857,991 | 8/1989 | Music | 358/13 |
| 4,857,993 | 8/1989 | Music | 358/13 |
| 5,065,144 | 11/1991 | Edelson et al. . | |
| 5,095,374 | 3/1992 | Klein | 358/430 |
| 5,239,625 | 8/1993 | Bogart et al. . | |
| 5,295,235 | 3/1994 | Newman . | |
| 5,299,018 | 3/1994 | Jefferson | 358/261.1 |
| 5,329,360 | 7/1994 | Gillard | 348/472 |
| 5,390,262 | 2/1995 | Pope | 358/474 |

*Primary Examiner*—Dwayne Bost
*Assistant Examiner*—Brian L. Johnson
*Attorney, Agent, or Firm*—Watson Cole Stevens Davis, P.L.L.C.

[57] ABSTRACT

The invention implements a run-length file format with improved space-saving qualities. The file starts with a header in ASCII format and includes information such as the file format, maximum X and Y values, and a color palette. The binary raster data include at least one byte for each pixel run to indicate the color selected from the color palette and the run length. Concatenation flags demarcate groups of bytes. According to a first embodiment, each run is indicated by a variable-length sequence of bytes with the color in a fixed-length field and the repeat number in a variable-length field. According to a second embodiment, the color and run length are given in separate byte strings, each having a variable length. The file also includes line offset pointers to permit navigation of the file without decompressing it and thus to facilitate operations such as panning and zooming.

24 Claims, 2 Drawing Sheets

METHOD OF STORING RASTER IMAGE IN RUN LENGTHS HAVNG VARIABLE NUMBERS OF BYTES AND MEDIUM WITH RASTER IMAGE THUS STORED

FIELD OF THE INVENTION

The invention relates to techniques for storing raster image data in an information medium and in particular to techniques for storing raster image data in a compressed form by way of run-length encoding. Throughout the specification and claims, "information medium" means a floppy disc, hard disc, magnetic tape, CD-ROM, a computer's RAM, or any equivalent thereof.

DESCRIPTION OF THE PRIOR ART

In many computer applications, images are stored and manipulated in the form of raster image data, or in other words, data derived from breaking the images down into units called pixels, each specified by a position and a color. Processes for forming and manipulating raster image data typically assume a rectangular image whose pixels are read like a page of text, namely, left to right in lines shifting from top to bottom.

The most direct way of storing the raster image data associated with an image is in bit-mapped format. In this format, the color for each pixel is specified separately. For example, a series of five red pixels followed by three green pixels is represented, in effect, as "red, red, red, red, red, green, green, green." The use of bit-mapping in computer displays is discussed in U.S. Pat. No. 4,704,605 to Edelson. For images having large areas of uniform color, this format contains much redundant information.

A common technique for reducing the amount of redundant information included in raster image data is called run-length encoding. In run-length encoding, a run of pixels having the same color is represented by a color and a run length, which is an indication of the number of pixels in the run. For example, a series of five red pixels followed by three green pixels is represented, in effect, as "five reds, three greens." U.S. Pat. Nos. 5,239,625 to Bogart et al and 5,299,018 to Jefferson teach the use of run-length encoding in computer imaging and facsimile storage, respectively. All of the foregoing patents are incorporated, in their entirety, by reference.

Computer users deal increasingly with images having various numbers of colors. For instance, monochrome displays have given way to four-bit displays capable of displaying sixteen ($=2^4$) colors, which in turn have given way to eight-bit displays capable of displaying 256 ($=2^8$) colors. Many displays even permit 24-bit "true color," for 16,777, 216 ($=2^{24}$) colors.

The use of such a diversity of image types raises problems. For example, Jefferson's run-length-encoded facsimile file format is incapable of indicating any colors except black and white. While Bogart et al use a run-length-encoded format that indicates color, the length of the color field is fixed at eight bits.

Another problem with conventional run-length-encoded formats is that raster image data stored in them must often be converted to a bit-mapped format to be useful, especially for operations involving panning, zooming, or the like. This conversion takes time, processor power, and memory.

SUMMARY OF THE INVENTION

It is an object of the invention to store raster image data in a run-length-encoded format useful for images having varying numbers of colors.

It is a further object of the invention to store raster image data in a run-length-encoded format having a file header for easy determination of the number of colors used.

It is a further object of the invention to store raster image data in a run-length-encoded format that facilitates access to specified parts of the image.

To these and other objects, the invention implements a run-length-encoded file format having the following characteristics. The file starts with a header in ASCII format and includes information such as the file format, maximum X and Y values, and a color palette. The binary raster data include at least one byte for each pixel run to indicate the color selected from the color palette and the run length. Each byte in the binary raster data begins with a concatenation flag bit; this bit is set ON for every byte in a sequence of bytes except the last byte, which has its concatenation flag bit set off. Thus, the concatenation flags demarcate groups of bytes. According to a first embodiment, each run is indicated by a sequence of bytes; the first byte includes the color number from the color palette and, in the remaining space, the most significant bits of the repeat value; the lower bits of the repeat value trail into additional bytes. According to a second embodiment, which is used for 64 or more colors and is useful particularly for 24-bit color, the color number from the palette is given in at least one byte; if more than one byte is needed, the concatenation flag bits and set appropriately. The run length is indicated in a separate series of bytes with the concatenation flag bits set independently of those for the color. The file also includes line offset pointers to permit navigation of the file without decompressing it and thus to facilitate operations such as panning and zooming. The invention, like the prior art, preferably assumes a rectangular image read like a page of text, from left to right in lines shifting from top to bottom.

It will now be seen that the invention, as described above, allows the transfer of lossless chart raster image data in a compact form. Some users will be able to use a file created in accordance with the invention as it stands, while others will want to translate formats. Still others will want to adapt the file format for use with their own software.

The run-length-encoded file format of the invention differs from conventional run-length encoding schemes in that the run packet is not fixed in size, but is a bit stream whose length is indicated by the concatenation flag bits. According to the first embodiment of the invention, part of the first byte in a run packet is used as a color palette pointer, while the remainder of the first byte begins the repeat count. If the remainder of the first byte does not have enough bits to indicate the repeat count, additional bytes are added until sufficient bits are available to indicate the repeat count. Since seven bits are available in each byte, each additional bit multiplies the value of the repeat count as expressed in the preceding byte by 128.

In accordance with this first embodiment, images with limited colors can have short runs expressed in one byte. For example, if an image has fifteen or fewer colors, a run eight or fewer pixels is expressed in one byte, a run of nine to 1,024 pixels in two bytes, and a run of 1,025 to 131,072 pixels in three bytes.

In accordance with the second embodiment, each run packet includes two bit streams: one for the color and one for the run length. If the most commonly used colors are represented by low numbers in the color palette, a run packet for one of the 127 most often used colors requires only one byte to indicate the color. Thus, the second embodiment can represent 24-bit color in a space-saving manner.

3

DETAILED DESCRIPTION OF THE PREFERRED EMBODIMENTS

I. Overview of File Format

Figure 1:
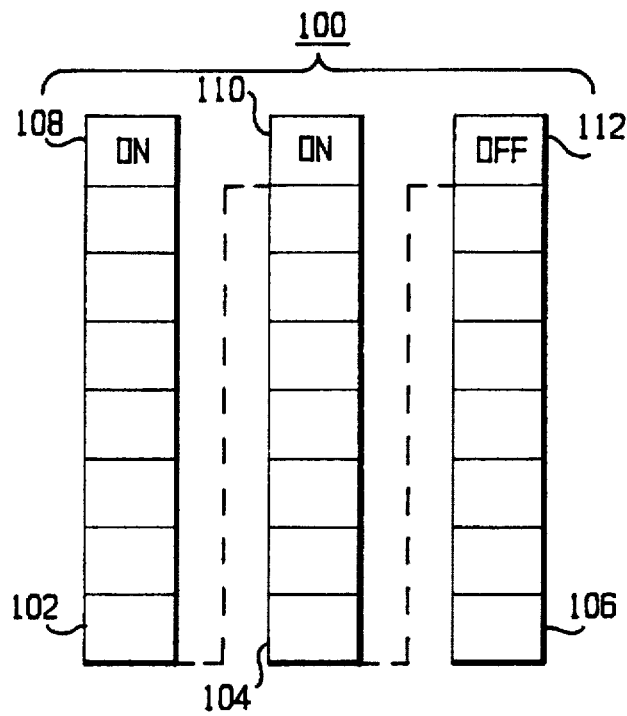
FIG. 1 shows a basic technique for concatenation of bytes in a bit stream as used in the invention.

Each of the embodiments of the invention implements a file format having three major segments: a header, binary graphic data, and strip offset tags. These major segments will be described briefly here and in more detail later. The header and the strip offset tags are the same for the two embodiments. The two embodiments differ in the binary graphic data.

The header provides a brief description of a few chart parameters, the encoding method, comments, and the color palette. This segment of the file is preferably readable as an ASCII text file and is modeled after Intergraph's Standard Interchange Format. The header may also include ASCII geographic and vector data as desired.

The binary graphic data are stored in a nondestructive run-length-encoded format of bit stream fields. Each run packet indicates the color and the run length or repeat number and ranges in size from one byte upward, with as many bytes as needed being used to hold large palettes or long run lengths.

The strip offset tags permit navigation of the file while it is still compressed and thus within the limitations of the PC's memory. They can be used for panning, zooming, and creating a new display origin. Those skilled in the art who have reviewed this specification will understand the potentials of this feature.

II. Header

The header is preferably stored as ASCII text. It is conveniently treated as having multiple records.

The first record includes general information relating to the file in the form of phrases separated by commas. It begins with the string NOS/NA=followed by a name selected for the image. It also includes the range of x and y values, indicated as RA=followed by the minimum and maximum x and y values. Other phrases may include the date (m/d/y), time (h/m/s.ss), and drawing units in pixels/inch. For example, if the file CHART.NOS is created on Jan. 1, 1990, at 1.1 seconds past midnight, measures 320 pixels across by 240 pixels down, and has a resolution of 254 pixels/inch, this record will read thus:

NOS/NA=CHART.NOS,RA=1,1,320,240,DA=1/1/90, TI=0/0/1.1,DU=254.

The first record is followed by RGB records, which signify the colors of the palette, with each color being represented by a palette tag followed by the percentage (255=100%) of the additive colors red, green, and blue. Any size palette may be used as needed, although smaller palettes permit greater compression. The values of the palette tags

4 are positive integers greater than zero. For example, if color 1 is 100% black and color 2 is 100% red, the RGB records will read thus:

RGB/1,0,0,0

RGB/2,255,0,0

The IFM record flags the internal format as format 2–7 (with format 1 being reserved for a format under development) as follows. Formats 2–6 are used in the first embodiment of the invention and indicate the size of a reserved color field, which size is a constant determined by the number of bits required by the palette. The format number is related to the number of colors in the palette thus:

| Format number | Number of colors in palette |
| --- | --- |
| 2 | 2–3 |
| 3 | 4–7 |
| 4 | 8–15 |
| 5 | 16–31 |
| 6 | 32–63 |

Format 7 is implemented in the second embodiment of the invention and is used for palettes of 64 or more colors. In format 7, the color bit stream and run-length bit stream are separate. Each bit stream length varies as needed to represent the current value. This format permits "intelligent" rasters.

The header may also include the following optional records. Comments begin with an "!" (exclamation point). OST/Offset represents the number of pixel lines between offset tags. VER/Version represents the version number of the file format, currently 1.

The header is followed by three binary values. The first is 1AH, which the DOS TYPE command will treat as an end-of-file marker. A zero is used to separate file segments or image offsets. The value of the image format is the start of the binary graphic data.

III. Binary Graphic Data

Concatenation of bytes into bit streams of variable lengths is an important part of the binary graphic data according to both embodiments of the invention and will be explained with respect to FIG. 1. In FIG. 1, bit stream 100 includes bytes 102, 104, and 106. Each of the bytes begins with concatenation flag byte 108, 110, or 112 as the most significant bit; the rest of each of the bytes, consisting of seven less significant bits, is used for storing the desired value. Concatenation flag bit 108 or 110 of each of bytes 102 and 104 is set ON to indicate that there is at least one further byte in the bit stream. Concatenation flag bit 112 of byte 106 is set OFF to identify byte 106 as the last byte of the bit stream. By the use of these concatenation bits, bit streams of any number of bytes, from one on up, can be used, and their boundaries can be readily distinguished. This data scheme is analogous to decimal representation of numbers in terms of place value; just as each additional digit increases the magnitude ten times, each additional byte increases the magnitude 128 times (not 256 because of the presence of the concatenation flag bit).

Figure 2:
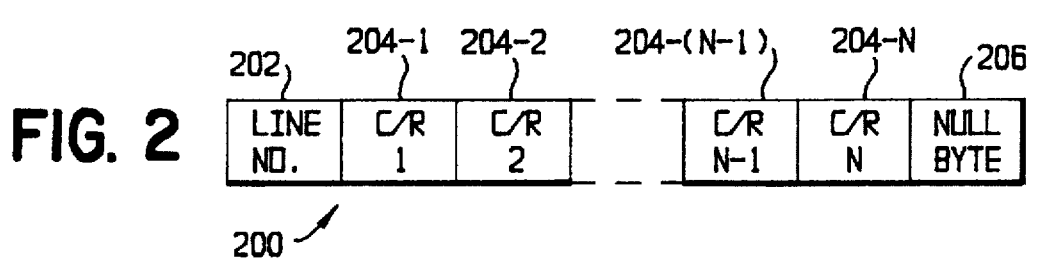
FIG. 2 shows a representation of a line of pixels according to the invention.

A broad concept of run-length encoding as used in the invention will now be explained with respect to FIG. 2. In FIG. 2, a line of pixels in the image is stored as block of bytes 200. This block of bytes begins with line number 202; the line numbering starts with one. After the line number are a succession of run packets 204-1, 204-2, . . . 204-(N-1), 204-N indicative of N run lengths in the line. The format of each of the run packets will be explain below with respect to each of the two embodiments each run packet indicates the color and length of the corresponding run. The block ends with null byte 206, which is an end-of-line indicator. Thus, each line of raster data is represented thus: "Line number, color 1, run 1, color 2, run 2, . . . color N, run N, null." Of course, the sum of the run lengths in a line equals the line width, which for a rectangular image is constant. This format contains the following redundant information: Each line begins with a line number, has the correct number of pixels, and ends with a null byte.

The technique for encoding each run packet will now be described. This technique provides the chief difference between the two embodiments and an important difference between the invention and the prior art.

In the first embodiment (formats 2–6), the color definition takes up a fixed number of bits in each run packet, while the entire run packet has a variable length. Also, the first byte in the run packet includes the color definition and the most significant bit or bits of the repeat value. More specifically, in the first byte of the run packet, the first bit is the concatenation flag bit. The next N bits, where N is the format number, are used for the palette tag of the color as assigned in the palette. That is, format 2 reserves two bits for the color, while format 3 reserves three bits, and so on. The remainder of the first byte is used to write the repeat number. If the repeat number can be completely expressed in the number of bits remaining in the first byte, it is so expressed, and the concatenation flag bit is set OFF. Otherwise, the concatenation flag bit is set ON, the highest-order bits of the repeat number are written into the remainder of the first byte, and at least one additional byte is added to express the repeat number fully. The concatenation flag of every byte except the last byte of the run packet is set ON. The run length is the repeat number plus one.

Figure 3:
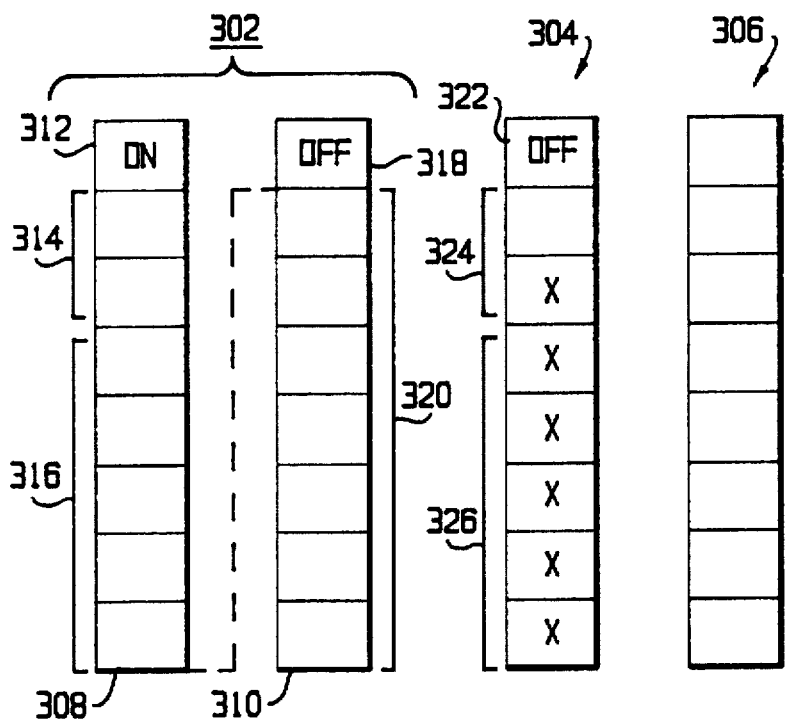
FIG. 3 shows the run format used in a first embodiment of the invention.

An example in format 2 will now be described with respect to FIG. 3, which shows two run packets 302 and 304 and end-of-line marker 306. Run packet 302 includes two bytes: first byte 308 and second byte 310. In the first byte, color field 314, which in format 2 is always two bytes long, indicates the color having palette tag 3; the identity of this color is defined in the header. Five bits remain in portion 316 of the first byte for the repeat number. Because the repeat number when written in binary form is more than five bits long, concatenation flag bit 312 of the first byte is set ON, and the five most significant bits of the repeat number are written into the first byte. The remaining bits are written into portion 320 of the second byte, which is all of the second byte except concatenation flag bit 318, as the second byte does not need to indicate the color. Since no more bytes are needed, the concatenation flag bit of the second byte is turned OFF. The repeat number is (value of portion 316) *128+(value of portion 320)=31*128+3=3971. Because the run length is one greater than the repeat number, the run length is 3972. Similarly, run packet 304 has color field 324 indicating the color having palette tag 1 and remaining portion 326 indicating a repeat number of 31, for a run length of 32. Because the color field and repeat number can together fit within seven bits, concatenation flag bit 322 is set OFF, and no more bytes are used. End-of-line byte 306 is a null byte.

An example will now be given of conversion from the binary data written in a file to palette tags and run lengths. If a file whose file header identifies the format as format 3 contains the bytes F6 70 (H)=1111 0110 0111 0000 (B), these bytes are analyzed thus.

| Byte 1 | | |
|---|---|---|
| Concatenation flag bit | 1 | Concatenate the next byte |
| Color bit 1 | 1 | Color is represented by palette tag 7. |
| Color bit 2 | 1 | |
| Color bit 3 | 1 | |
| Run length bit 1 | 0 | Byte 1 portion of the repeat number is 6. |
| Run length bit 2 | 1 | |
| Run length bit 3 | 1 | |
| Run length bit 4 | 0 | |

| Byte 2 | | |
|---|---|---|
| Concatenation flag bit | 0 | Final byte of stream |
| Run length bit 5 | 1 | Byte 2 part of the repeat number is 112. |
| Run length bit 6 | 1 | |
| Run length bit 7 | 1 | |
| Run length bit 8 | 0 | |
| Run length bit 9 | 0 | |
| Run length bit 10 | 0 | |
| Run length bit 11 | 0 | |

The run length is 6*128+112+1=881. In a three-byte concatenation, the run length is (byte 1 run)*128*128+(byte 2 run)*128+byte 3 run+1.

In the second embodiment (format 7), each run packet indicates the color and the run length as separate variable length bit streams with byte borders indicated by the concatenation flag bits. Given a large palette, even all 16,777,216 possible colors in 24-bit color, the colors are ranked in order of frequency of use. The colors thus ranked are then numbered, with the most frequently used being number 1 and so on. Thus, the 127 most often used colors can be represented in one byte each, while the next sixteen thousand require only two bytes each. This ranking, along with the run-length encoding, significantly decreases the file size.

In each run packet, the first bit stream represents the color, while the second bit stream represents the run length (not the repeat number, as in formats 2–6). Thus, in format 7, the two bytes F6 70 (H) identify only a palette tag of a color, specifically, palette tag 15,216.

Figure 4:
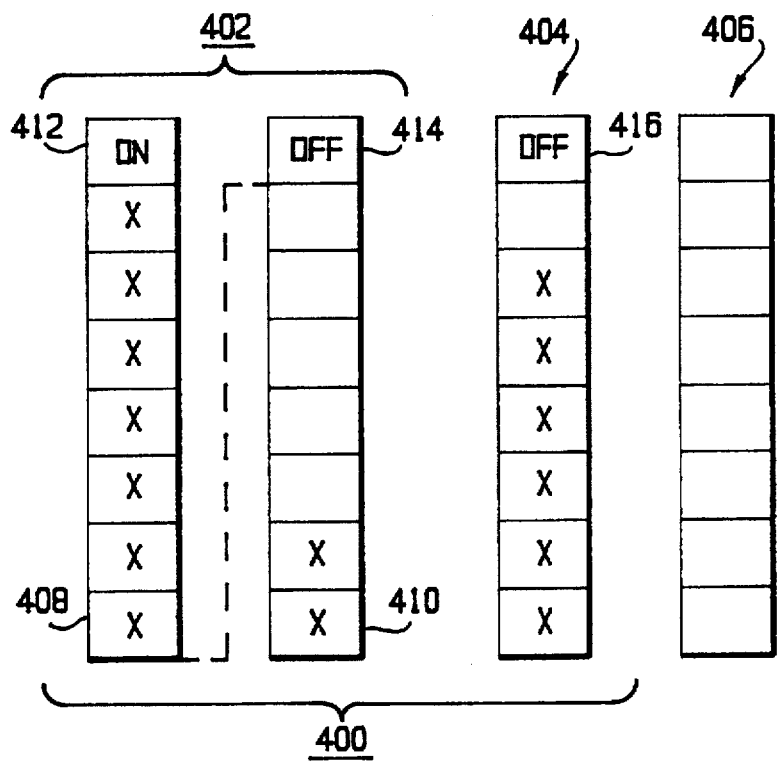
FIG. 4 shows a run format used in a second embodiment of the invention.

An illustrative example of a run packet recorded in accordance with format 7 is shown in FIG. 4. Run packet 400 includes color bit stream 402 and run-length bit stream 404 and is followed by end-of-line marker (null byte) 406. The color bit stream includes two bytes: first byte 408, with concatenation flag bit set ON, and second byte 410, with concatenation flag bit 414 set OFF. The palette number is thus 127*128+3=16,259. The run-length bit stream consists of a single byte, whose concatenation flag bit 416 is set OFF. The run length is 63.

Assume a raster line is written as 01 F6 70 76 00. In all six file formats, the 01 will represent line 1. However, the makeup of this line will differ according to the file format thus:

| Format | Color 1 | Run 1 | Color 2 | Run 2 |
|---|---|---|---|---|
| 2 | 3 | 2929 | 3 | 23 |
| 3 | 7 | 881 | 7 | 7 |
| 4 | 14 | 881 | 14 | 7 |
| 5 | 29 | 369 | 29 | 3 |
| 6 | 59 | 113 | 59 | 1 |
| 7 | 15,216 | 119 | None: This line has only one run. | |

The null byte 00 indicates the end of the line. At least four null bytes follow the raster data.

IV. Strip Offset Tags

Figure 5:
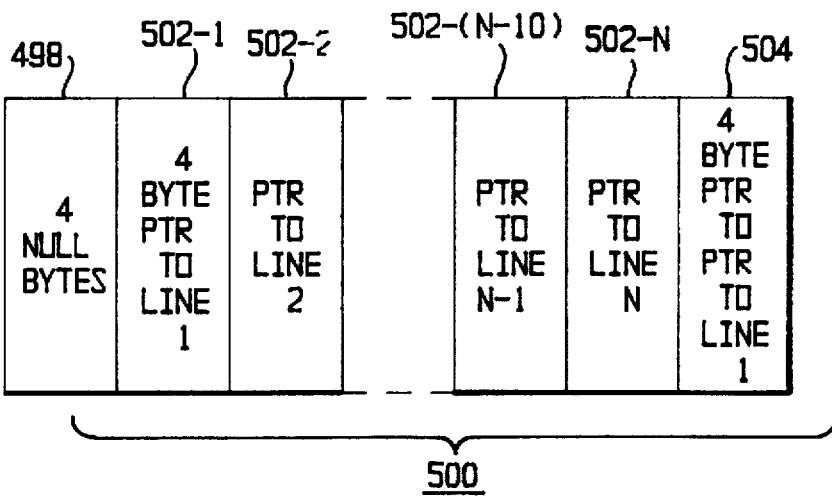
FIG. 5 shows a set of line offset pointers used in the invention.

The file ends with a string of strip offset tags that point to various locations of the file for easy navigation. As shown in FIG. 5, after four null bytes 498 indicating the end of the raster data comes block 500 of strip offset tags. Each strip offset tag has four bytes. Strip offset tags 502-1, 502-2, ... 502-(N-1), 502-N point to strips 1, 2, ... N-1, N. The header contains an entry indicating the number of raster lines in each strip. The last entry in the block of strip offset tags, and thus in the file, is pointer 504, which points to pointer 502-1 to line 1. Since each tag is four bytes long, it is easy to locate the address of the pointer to any strip. Also, since the tags have a fixed length, concatenation flag bits are not needed.

The interpretation of these strip offset tags will now be explained with respect to a file containing the two lines described above. If the header occupies bytes 0 and 1 (which will be written in this example as hh hh), the file reads thus:

hh hh 01 F6 70 76 00 02 F6 70 76 00 00 00 00 02 00 00 00 07 00 00 00 0C.

The last long integer, written as four concatenated bytes, is 0C (H)=12 (D). This is the disk location of the first offset strip pointer. Counting from 0, the twelfth byte string of four bytes is 02 (H)=2 (D). Again counting from 0, byte 2 is the head (Y value) of the first string. The next offset pointer is at 12+4=16. This offset tag has the value 7, which points to the head of the next string.

We claim:

1. A method of writing a file representative of a raster image onto an information medium, the method comprising:
   (a) determining a color field length necessary to enumerate all colors in the raster image;
   (b) writing a file header indicating the color field length;
   (c) dividing the raster image into pixel runs, each of the pixel runs having a color and a run length; and
   (d) for each of the pixel runs:
      (i) writing a first block including a concatenation flag and indicating the color in a field of the color field length;
      (ii) if the run length is such that first block is sufficient to express completely the color and the run length, writing the run length in the first block and setting the concatenation flag of the first block to indicate that no further blocks are used to express the pixel run;
      (iii) if the run length is such that the first block is not sufficient to express completely the color and the run length:
         (I) allocating at least one additional block, each of said at least one additional block having a concatenation flag;
         (II) writing the run length in the first block and in the at least one additional block; and
         (III) setting the concatenation flags of the first block and of the at least one additional block to indicate that the first block and the at least one additional block together express the pixel run.

2. A method as in claim 1, wherein:
   step (d)(ii) comprises setting the concatenation flag of the first block OFF; and
   step (d)(iii)(III) comprises:
      (A) setting the concatenation flag of a last block included in the at least additional block OFF; and
      (B) setting the concatenation flag of the first block and the concatenation flags of all blocks included in the at least one additional block except the last block ON.

3. A method as in claim 1, further comprising writing offset pointers to addresses of predetermined locations in the raster image.

4. A method as in claim 1, wherein step (b) comprises writing the file header as human-readable text.

5. A method of writing a file representative of a raster image onto an information medium, the method comprising:
   (a) dividing the raster image into pixel runs, each of the pixel runs having a color and a run length; and
   (b) for each of the pixel runs:
      (i) writing a number indicating the color into at least one block on the information medium, each block in the at least one block having a concatenation flag, and setting the concatenation flag in said each block to indicate a number of blocks used in said at least one block; and
      (ii) writing a number indicating the run length into at least one block on the information medium; each block in the at least one block having a concatenation flag, and setting the concatenation flag in said each block to indicate a number of blocks used in said at least one block.

6. A method as in claim 5, wherein each of steps (b)(i) and (b)(ii) comprises:
   (a) when the number of blocks used in said at least one block is one, setting the concatenation flag of the first block OFF; and
   (b) when the number of blocks used in said at least one block is more than one, setting the concatenation flag of a last block included in the at least one additional block OFF, and setting the concatenation flag of the first block and the concatenation flags of all blocks included in the at least one additional block except the last block ON.

7. A method as in claim 5, further comprising writing offset pointers to addresses of predetermined locations in the raster image.

8. A method as in claim 5, further comprising:
   (I) ranking all colors used in the raster image in order of frequency of occurrence in the raster image;
   (II) numbering said all colors in the order of the frequency of occurrence, thereby assigning a ranking number to each of said all colors;
   (III) writing a file header comprising a list of correspondences between said all colors and said ranking numbers; and
   (IV) in step (b)(i), using the ranking number assigned to the color as the number indicating the color.

9. A method as in claim 8, wherein step (III) comprises writing the file header as human-readable text.

10. An information medium having a data file representative of a raster image written thereon, the raster image having a plurality of pixel runs each having a color and a run length, the data file comprising:
    (a) a file header indicating a fixed color field length; and
    (b) for at least one of the pixel runs, a run packet comprising more than one block, including an indication of the color and an indication of the run length, the indication of the color being written in a field of the fixed color field length, each block in the run packet having a concatenation flag which is set to indicate whether said each block is a last block in the run packet.

11. An information medium as in claim 10, wherein:
    the concatenation flag of the last block is set OFF; and
    if the run packet comprises more than one block, the concatenation flag of every block in the run packet except the last block is set ON.

12. An information medium as in claim 10, further comprising offset pointers to addresses of predetermined locations in the raster image.

13. An information medium as in claim 10, wherein the file header comprises human-readable text.

14. An information medium having a data file representative of a raster image written thereon, the raster image having a plurality of pixel runs each having a color and a run length, the data file comprising, for each of the pixel runs, a run packet comprising:

a color packet, expressing a number indicating the color and occupying at least one block on the information medium, each block in the color run having a concatenation flag, and the concatenation flag in said each block being set to indicate whether said each block is a last block of the color packet; and a run-length packet, expressing a number indicating the run length and occupying at least one block on the information medium, each block in the run-length packet having a concatenation flag, the concatenation flag in said each block being set to indicate whether said each block is a last block of the run-length packet.

15. An information medium as in claim 14, wherein:

the concatenation flag of last block of each of the color packet and the run-length packet is set OFF; and the concatenation flag of each block of each of the color packet and the run-length packet except for the last block is set ON.

16. An information medium as in claim 14, further comprising offset pointers to addresses of predetermined locations in the raster image.

17. An information medium as in claim 14, wherein:

all colors used in the raster image are ranked and numbered in order of frequency of occurrence in the raster image, so that a ranking number is assigned to each of said all colors;

the file further comprises a file header comprising a list of correspondences between said all colors and said ranking numbers; and in each of the run packets, the ranking number assigned to the color is used as the number indicating the color.

18. An information medium as in claim 17, wherein the file header comprises human-readable text.

19. A product formed by the method of claim 1.

20. A product formed by the method of claim 5.

21. A method as in claim 4, wherein the human-readable text comprises at least one line of ASCII text followed by an end-of-file marker.

22. A method as in claim 9, wherein the human-readable text comprises at least one line of ASCII text followed by an end-of-file marker.

23. An information medium as in claim 13, wherein the human-readable text comprises at least one line of ASCII text followed by an end-of-file marker.

24. An information medium as in claim 18, wherein the human-readable text comprises at least one line of ASCII text followed by an end-of-file marker.

* * * * *